(12) United States Patent
Bouthillier et al.

(10) Patent No.: US 11,975,407 B2
(45) Date of Patent: May 7, 2024

(54) LOCKING MECHANISMS IN A LASER NOZZLE HOLDER

(71) Applicant: Hypertherm, Inc., Hanover, NH (US)

(72) Inventors: David L. Bouthillier, Hartford, VT (US); Carmen Harp, Grafton, NH (US); David K. Knapp, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 452 days.

(21) Appl. No.: 16/911,917

(22) Filed: Jun. 25, 2020

(65) Prior Publication Data
US 2020/0406396 A1 Dec. 31, 2020

Related U.S. Application Data

(60) Provisional application No. 62/866,249, filed on Jun. 25, 2019.

(51) Int. Cl.
*B23K 26/14* (2014.01)
*B23Q 3/155* (2006.01)
*F16L 37/12* (2006.01)
*H05H 1/34* (2006.01)

(52) U.S. Cl.
CPC ...... *B23K 26/1482* (2013.01); *B23K 26/1462* (2015.10); *B23Q 3/1556* (2013.01); *F16L 37/12* (2013.01); *H05H 1/34* (2013.01)

(58) Field of Classification Search
CPC . F16L 37/00; B23K 26/1462; B23K 26/1482; H05H 1/34

USPC ............... 403/9, 199; 285/317; 219/121.78, 219/121.84, 121.64, 121.67
See application file for complete search history.

(56) References Cited

U.S. PATENT DOCUMENTS

| 4,625,918 | A | * | 12/1986 | Funada | ............... | F02M 65/005 |
| | | | | | | 239/533.3 |
| 7,129,441 | B2 | | 10/2006 | Yamazaki et al. | | |
| 2005/0061790 | A1 | * | 3/2005 | Lambert | ............ | B23K 26/1482 |
| | | | | | | 219/121.84 |

(Continued)

FOREIGN PATENT DOCUMENTS

| DE | 102007050878 B4 | 7/2008 |
| EP | 2110198 A2 | 10/2009 |

(Continued)

*Primary Examiner* — Vy T Nguyen
(74) *Attorney, Agent, or Firm* — Cesari and McKenna, LLP (57) ABSTRACT

A nozzle holder for a laser processing head of a laser processing system is provided. The nozzle holder includes a substantially cylindrical hollow body shaped to matingly engage a laser nozzle. The hollow body defines a longitudinal axis extending therethrough and a plurality of apertures dispersing around a circumference of the hollow body. The nozzle holder also includes a plurality of pawls configured to operably engage the laser nozzle within the hollow body by extending through the plurality of apertures of the hollow body. The nozzle holder further includes a sleeve substantially surrounding the hollow body and the plurality of pawls. The sleeve includes a pawl retractor that is movable along the longitudinal axis to physically displace the plurality of pawls axially and radially relative to the longitudinal axis for disengagement of the plurality of pawls from the laser nozzle.

20 Claims, 6 Drawing Sheets

(56) References Cited

U.S. PATENT DOCUMENTS

2009/0224534 A1* 9/2009 Liu .................. F16L 37/40
                                                285/148.14

FOREIGN PATENT DOCUMENTS

| JP | H04367392 A | 12/1992 |
| JP | 11221691 A1 | 8/1999 |
| WO | 2018157052 | 8/2018 |
| WO | 2020020483 A1 | 1/2020 |

* cited by examiner

LOCKING MECHANISMS IN A LASER NOZZLE HOLDER

CROSS REFERENCE TO RELATED APPLICATION

This application claims the benefit of and priority to U.S. Provisional Patent Application No. 62/866,249, filed Jun. 25, 2019, the entire contents of which are owned by the assignee of the instant application and incorporated herein by reference in their entirety.

TECHNICAL FIELD

The present invention generally relates to locking mechanisms on male and female components of a material processing system, such as an industrial laser cutting system.

BACKGROUND

Material processing systems, such as plasma, laser or liquid jet cutting systems, are widely used in the heating, cutting, gouging and marking of materials. For example, a plasma arc torch generally includes an electrode, a nozzle having a central exit orifice mounted within a torch body, electrical connections, passages for cooling, and passages for arc control fluids (e.g., plasma gas). In operation, the plasma arc torch produces a plasma arc, which is a constricted jet of an ionized gas with high temperature and sufficient momentum to assist with removal of molten metal. A liquid jet cutting system, which includes multiple consumables (e.g., a nozzle and an orifice in a cutting head), is configured to cut a workpiece by applying a jet of liquid, such as water, at high velocity to rapidly erode the workpiece. A laser cutting system, which generally includes a nozzle, a gas stream, an optical system, and a high-power laser for generating a laser beam, is configured to pass the laser beam and gas stream through the nozzle to impinge upon a workpiece to cut or otherwise modify the workpiece.

Figure 1:
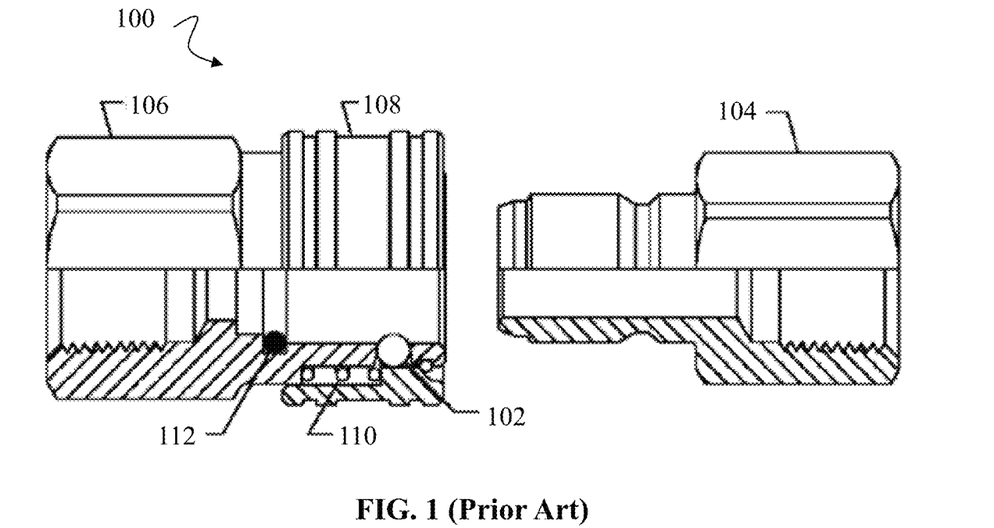
FIG. 1 shows a prior art pneumatic connection mechanism employing a set of one or more locking balls as the locking unit between a male component and a female component.

Connection mechanisms can be used to couple various components together in a material processing system. In some cases, these connection mechanisms can facilitate quick connection and disconnection of the components. In general, connection mechanisms have been available for pneumatic (air hoses) as well as hydraulic lines. Of these, a few connection designs support "push fit", "push lock", or "push to connect" type locking mechanisms that allow installation of a male component (e.g., a plug) into a female component (e.g., a receiver/holder) until the male component is locked into place. Removal of the male component requires retraction of a sleeve that interfaces mechanically with the locking units between the male and female components, which in turn allows these locking units to fall out of contact with the mated male component such that the male component is free for removal from the female component. In these designs, removal of the sleeve does not necessitate the disengagement of the locking units, which is accomplished instead via gravity or application of additional external force. These designs have extended into the material processing space, such as for a laser nozzle in a laser cutting system where alignment of the laser nozzle within the system is more crucial than that of the air hoses. In these laser cutting systems, locking units are typically of the following type: balls, bars, or pins. FIG. 1 shows a prior art pneumatic connection mechanism 100 employing a set of one or more locking balls 102 as the locking unit between a male component 104 and a female component 106. The male component 104 can be a plug, and the female component 106 can be a socket. As described above, a retractable sleeve 108 can be coupled to the female component 106 and configured to be translated away from the locking balls 102 by a spring mechanism 110 to permit the release of the locking balls 102 relative to the male component 104 without mechanically actuating the withdrawal of the locking balls 102 from the engaged position. Instead, the locking balls 102 are withdrawn by rolling backward in the channel by gravity or from the disengagement force applied to the male component 104. In some embodiments, an O-ring 112 is used to provide an air-tight seal and minimize air flow in the vicinity.

Figure 2:
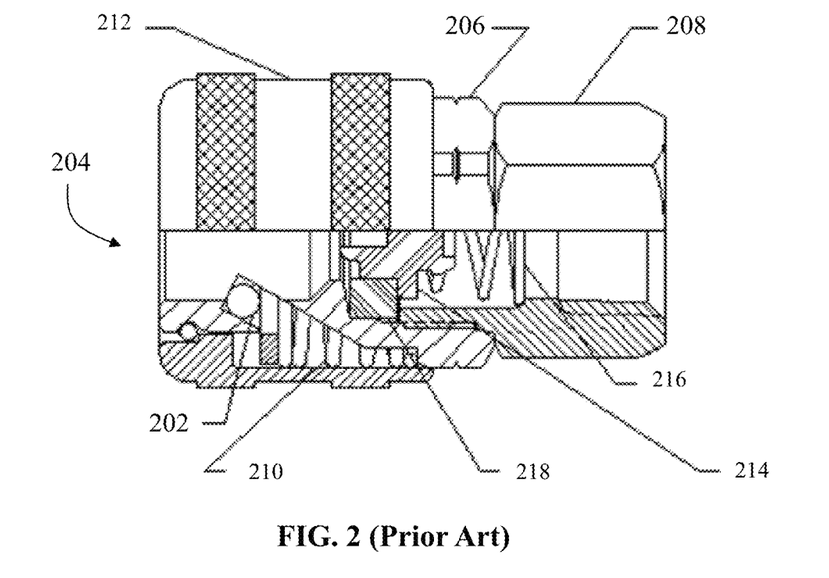
FIG. 2 shows another prior art pneumatic connection mechanism that includes a female component employing a set of one or more locking pins for engagement with a male component.

FIG. 2 shows another prior art pneumatic connection mechanism that includes a female component 206 employing a set of one or more locking pins 202 for engagement with a male component (not shown). The male component can be disposed into the female component 206 via a distal opening 204 that is located opposite of the proximal end 208 of the female component 206. A retractable sleeve 212 can be coupled to the female component 206 and configured to be translated away from the locking pins 202 by a spring mechanism 210 to release the locking pins 202 relative to the male component without actuating the withdrawal of the locking pins 202 from the engaged position. In general, the connection mechanism of FIG. 2 operates in substantially the same manner as the mechanism of FIG. 1 with the exception of the usage of the locking pins 202 instead of the locking balls 102. In some embodiments, a pressurized gas is released when the male component is fully inserted into the female component 206. Specifically, the male component is adapted to depress a spring 216 connected to a valve 214 to separate the valve 214 from a valve seal 218, thereby creating a gap through which the pressurized gas travels.

Figure 3A:
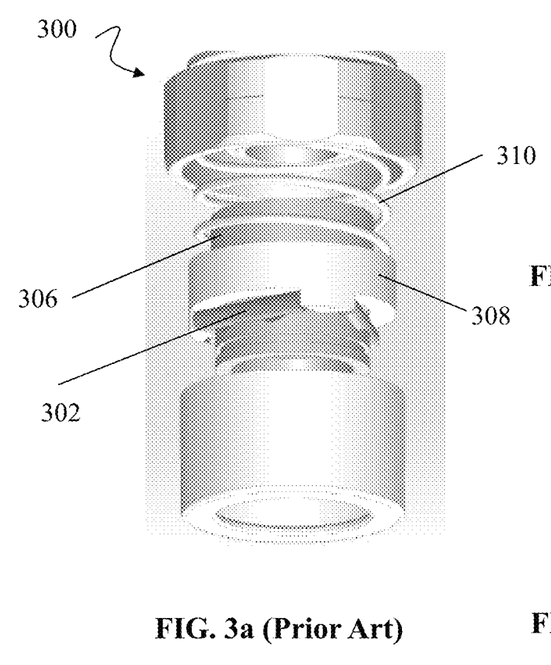
FIGS. 3a-c show yet another prior art pneumatic connection mechanism that includes a female component employing a set of one or more locking bars for engagement with a male component.
Figure 3B:
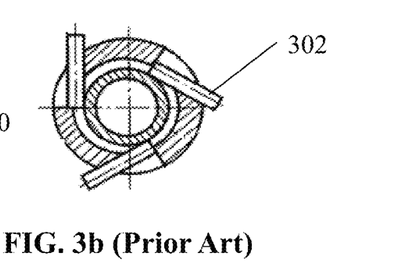
Figure 3C:
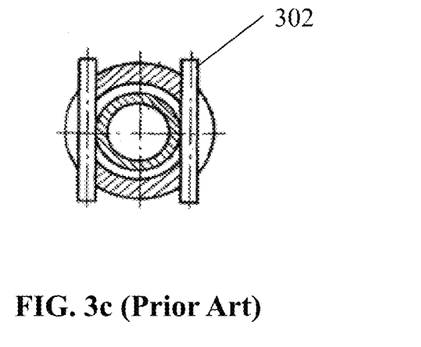

FIGS. 3a-c show yet another prior art pneumatic connection mechanism that includes a female component 300 employing a set of one or more locking bars 302 for engagement with a male component (not shown). Specifically, FIG. 3b shows the female component 300 with three locking bars 302, and FIG. 3c shows the female component 300 with two locking bars 302. To engage the male component, the locking bars 302 of the female component 300 are adapted to roll into their respective grooves (not shown) on the wall of the hollow body 306 of the female component 300 for engagement with the male component disposed inside of the hollow body 306. A retractable sleeve 308 can be coupled to the female component 300 and configured to be translated away from the locking bars 302 by a spring mechanism 310 to release the locking bars 302 for subsequent withdrawal from their respective grooves. Similar to the prior art designs of FIGS. 1 and 2, translation of the sleeve 308 away from the locking bars 302 does not actively drive the withdrawal of the locking bars 302 from the engaged position. Instead, the locking bars 302 are withdrawn by rolling backward in their respective grooves by gravity or from the disengagement force applied to the male component. Further, in this design, movement of the locking bars 302 relative to their grooves is confined to the radial plane perpendicular to the longitudinal axis of the female component 300, which may prevent the locking bars 302 from being fully seated in their respective grooves to achieve a tight tolerance fit with the male component in the hollow body 306 of the female component 300.

Figure 4:
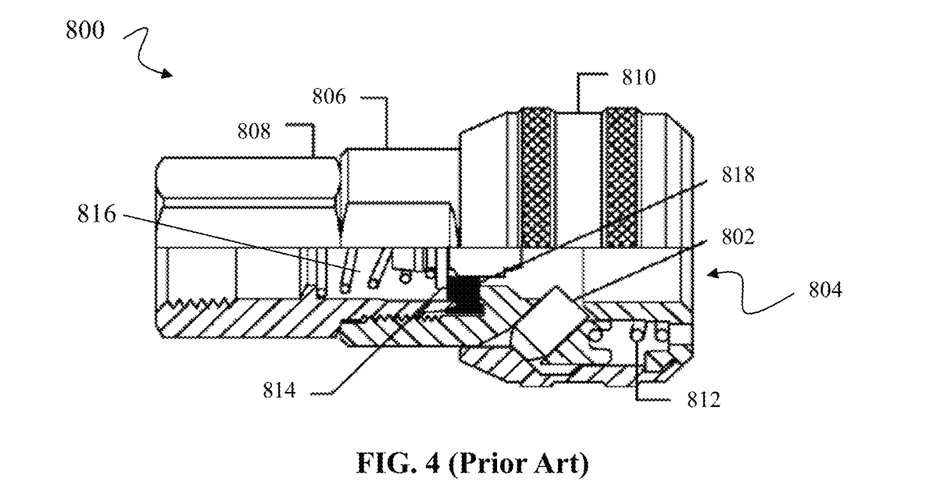
FIG. 4 shows show yet another prior art pneumatic connection mechanism that includes a female component employing a set of one or more locking pins for engagement with a male component.

FIG. 4 shows yet another prior art pneumatic connection mechanism that includes a female component 800 employing a set of one or more locking pins 802 for engagement with a male component (not shown). The male component can be disposed into the hollow body 806 of the female component 800 via a distal opening 804 that is located opposite of the proximal end 808 of the female component 800. To engage the male component, the locking pins 802 of the female component 800 are adapted to be inserted into their respective channels on the wall of the hollow body 806 of the female component 800 for engagement with the male component inside of the hollow body 806. A retractable sleeve 810 can be coupled to the female component 800 and configured to be translated away from the locking pins 802 by a spring mechanism 812 to release the locking pins 802 for subsequent withdrawal from their respective channels. Again, similar to the prior art designs of FIGS. 1-3c, translation of the sleeve 810 away from the locking pins 802 does not actively drive the withdrawal of the locking pins 802 from the engaged position. Instead, the locking pins 802 are withdrawn by rolling backward in their respective channels by gravity or from the disengagement force applied to the male component. In some embodiments, a pressurized gas is released when the male component is fully inserted into the female component 800, which depresses a spring 816 connected to a valve 814 to separate the valve 814 from a valve washer 818, thereby creating a gap through which the pressurized gas travels.

In general, the ball, pin and bar locking units in the exemplary pneumatic connection mechanisms of FIGS. 1-4 are complex, difficult to manufacture, generate inconsistent engagement, and provide limited tolerance alignment via the relatively large contact areas where the mating components meet. In some cases, these designs produce an inconsistent and/or undesirable holding force on components as a result of their indirect application of retention force. For example, the pins, balls or bars of the prior art female components may not be fully inserted in their channels when making contact with the male component in the engaged position, thus cannot guarantee tight retention of the male component to the female component. In addition, these designs require multiple steps for disengaging the male component from the female component, such as retracting the sleeve followed by orienting the components to facilitate disengagement by gravity or pushing on the male component a certain way to achieve disengagement. Thus, there is a need for connection mechanism designs that remedy these deficiencies while supporting quick connect and disconnect of components in a material processing system, such as between a nozzle and a nozzle holder in a laser cutting system.

SUMMARY

The present invention provides a locking mechanism for material processing systems with industrial cutting components (e.g., laser consumables, laser nozzles, plasma cutting consumables, plasma nozzles, plasma electrodes, plasma cartridges, plasma torches, etc.). In some embodiments, the locking mechanism of the present invention can support interchangeability with existing systems/products (e.g., existing laser nozzles). In general, the instant locking mechanism improves alignment of the mating components using smaller contact areas while offering reliable, easy and quick connection and disconnection, as well as improved holding force using direct application of retention force (e.g., applied in both axial and radial directions).

The invention, in one aspect, features a nozzle holder for a laser processing head of a laser processing system. The nozzle holder includes a substantially cylindrical hollow body shaped to matingly engage a laser nozzle. The hollow body defines a longitudinal axis extending therethrough and a plurality of apertures dispersing around a circumference of the hollow body. Each aperture extends from an inner wall to an outer wall of the hollow body. The nozzle holder also includes a plurality of pawls configured to operably engage the laser nozzle within the hollow body by extending through the plurality of apertures of the hollow body. The nozzle holder further includes a sleeve coupled to the hollow body and substantially surrounding at least a portion of the hollow body and the plurality of pawls. The sleeve includes a pawl retractor that is movable along the longitudinal axis to physically displace the plurality of pawls axially and radially relative to the longitudinal axis for disengagement of the plurality of pawls from the laser nozzle.

In another aspect, the present invention features a nozzle holder for a laser processing head of a laser processing system. The nozzle holder includes a substantially cylindrical hollow body shaped to matingly engage a laser nozzle. The hollow body defines a longitudinal axis extending therethrough and a plurality of apertures dispersing around a circumference of the hollow body, where each aperture extends from an inner wall to an outer wall of the hollow body. The nozzle holder also includes a plurality of pawls configured to operably engage the laser nozzle by extending through the plurality of apertures of the hollow body. The nozzle holder further includes a sleeve coupled to and substantially surrounding the hollow body and the plurality of pawls. The sleeve includes a distal portion comprising a pawl retractor in physical contact with a flange of each of the plurality of pawls and a proximal portion configured to connect to the hollow body. The sleeve also includes a spring disposed between the proximal portion and the distal portion. The spring configured to exert a biasing force on the plurality of pawls to longitudinally and radially displace the plurality of pawls, such that the pawls extend through respective ones of the plurality of apertures to engage the laser nozzle. The pawl retractor is adapted to overcome the biasing force of the spring to longitudinally and radially displace the plurality of pawls away from respective ones of the apertures for disengagement from the laser nozzle.

In yet another aspect, the present invention features a method for engaging and disengaging a laser nozzle relative to a nozzle holder of a laser processing head in a laser processing system. The method includes providing the laser nozzle having a groove circumferentially disposed around an outer surface of the laser nozzle. The method also includes providing the nozzle holder having (i) a substantially cylindrical hollow body shaped to matingly engage the laser nozzle, where the hollow body defining a longitudinal axis extending therethrough, (ii) a plurality of apertures dispersing around a circumference of the hollow body, each aperture extending from an inner wall to an outer wall of the hollow body, (iii) a plurality of pawls, and (iv) a sleeve disposed about the hollow body and the plurality of pawls. The method additionally includes disposing the laser nozzle into the hollow body of the nozzle holder and biasing, by a spring located in the sleeve, in a distal direction a proximal end of each of the plurality of pawls. The method further includes displacing, radially and longitudinally with respect to the longitudinal axis, the plurality of pawls based on the biasing by the spring, such that the pawls extend through the plurality of apertures to engage the groove of the laser nozzle.

In some embodiments, the method also includes applying a force in a proximal direction on the pawl retractor that is in physical contact with a distal flange of each of the plurality of pawls and displacing, radially and longitudinally by the pawl retractor; the plurality of pawls away from respective ones of the plurality of apertures, thereby disengaging the laser nozzle from the nozzle holder Any of the above aspects can include one or more of the following features. In some embodiments, each of the plurality of pawls defines a pawl body having a proximal portion and a distal portion with a second longitudinal axis extending therebetween. The distal portion is configured to facilitate engagement of the pawl with the laser nozzle and the proximal portion is configured to facilitate disengagement of the pawl from the laser nozzle. In some embodiments, the second longitudinal axis is oriented at a non-normal angle relative to the longitudinal axis of the hollow body when at least a portion of the pawl body is located within the corresponding aperture.

In some embodiments, the distal portion of each pawl includes a substantially globular tip configured to extend through the corresponding aperture to engage with a complementarily-shaped groove of the laser nozzle. In some embodiments, the proximal portion of each pawl includes at least one flange configured to maintain physical contact with the pawl retractor of the sleeve. In some embodiments, the flange extends in a normal direction relative to the second longitudinal axis of the pawl body. In some embodiments, the pawl retractor is configured to engage the flanges of respective ones of the plurality of pawls to physically displace the pawls and retract the pawls from the plurality of apertures for disengagement from the laser nozzle.

In some embodiments, the plurality of pawls comprise three pawls located about 120 degrees apart circumferentially about the hollow body.

In some embodiments, the sleeve includes a proximal portion and a distal portion. The proximal portion is configured to connect to the hollow body, and the distal portion includes the pawl retractor. In some embodiments, the sleeve further includes a thread engagement section disposed on an interior surface of the sleeve at the proximal portion. The thread engagement section is configured to matingly engage a cutting head of the laser processing system.

In some embodiments, the sleeve further includes a spring disposed between the proximal portion and the distal portion. In some embodiments, the spring is configured to exert a biasing force to axially and radially displace the plurality of pawls relative to the longitudinal axis such that the plurality of pawls extend through the respective ones of the plurality of apertures to engage the laser nozzle. In some embodiments, when the spring is extended, the plurality of pawls are adapted to create an effective inner diameter of the hollow body that is smaller than an outer diameter of the laser nozzle. In some embodiments, the pawl retractor maintains physical contact with a distal end of each of the plurality of pawls. The pawl retractor is slidable along the longitudinal axis and configured to overcome the biasing force of the spring to radially and axially displace the pawls away from respective ones of the apertures for disengagement from the laser nozzle.

In some embodiments, the hollow body, the plurality of pawls and the sleeve are made from at least one electrically conductive material. The nozzle holder can form a conductive current path therethrough. In some embodiments, a sealing surface is disposed on the inner wall of the hollow body. The sealing surface is configured to receive an O-ring that sealingly engages a corresponding surface of the laser nozzle retained to the nozzle holder by the plurality of pawls.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 5A:
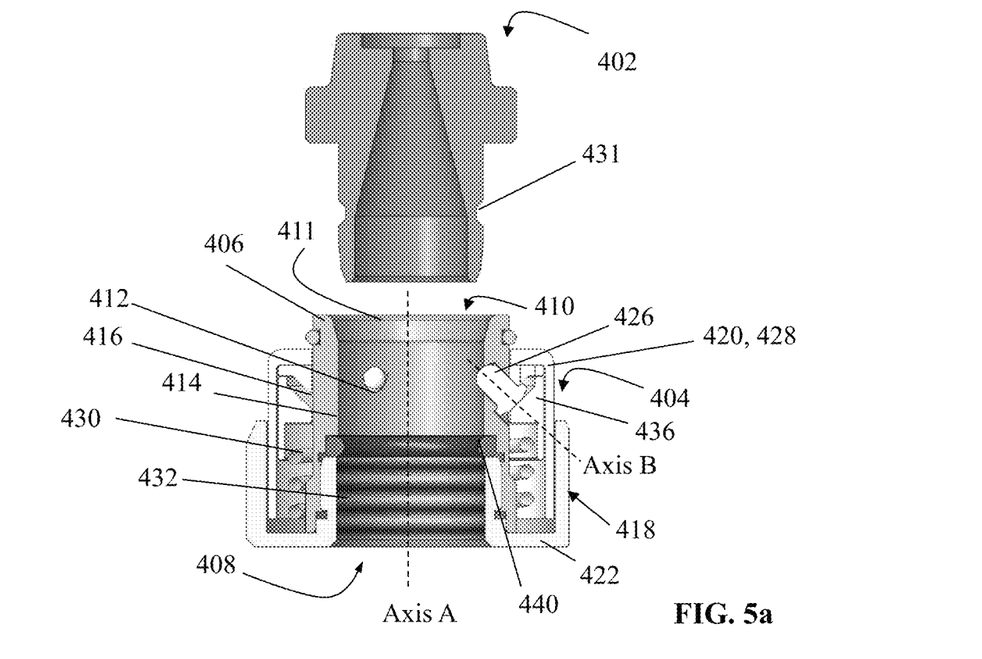
FIGS. 5a and 5b show a sectional view and an exploded view, respectively, of a female component prior to engagement to a male component of a material processing system, according to some embodiments of the present invention.
Figure 5B:
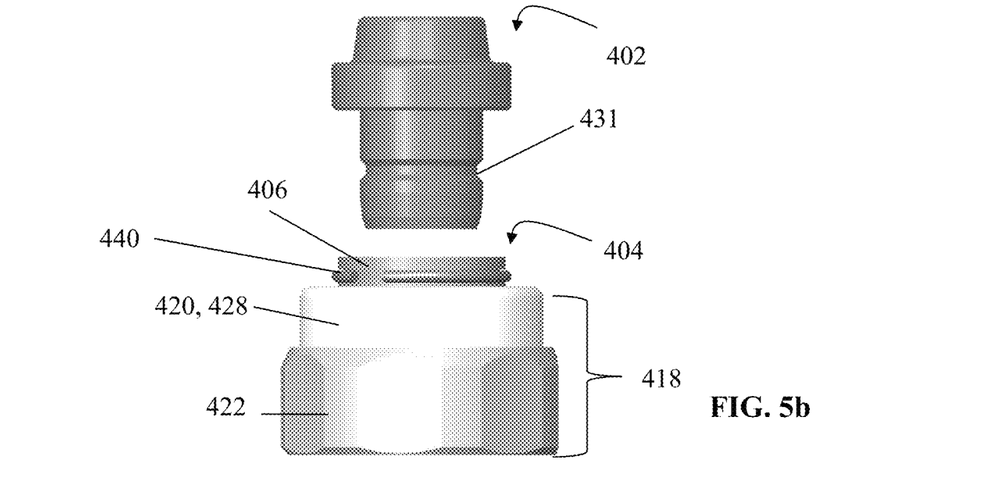

FIGS. 5a and 5b show a sectional view and an exploded view, respectively, of a female component 404 prior to engagement to a male component 402 of a material processing system, according to some embodiments of the present invention. The male and female component 402, 404 incorporate complementary, pneumatic push-fit connection mechanisms that enable their engagement and disengagement relative to each other. In the embodiment of FIGS. 5a and 5b, the male component is illustrated as a laser nozzle 402 for a laser cutting system, and the female component is illustrated as a laser holder 404 of the laser cutting system. Upon engagement of the male and female connection mechanisms of these two components, at least a portion of the laser nozzle 402 is disposed in and removably engaged to the nozzle holder 404. As understood by a person of ordinary skill in the art, the connection mechanisms of FIGS. 5a and 5b can be easily adapted to connect other components of a laser cutting system, or components of a different industrial material processing system, such as a plasma or waterjet cutting system.

As shown in FIGS. 5a and 5b, the nozzle holder 404 generally includes (i) a substantially cylindrical hollow body 406 shaped to matingly receive and engage the laser nozzle 402, (ii) multiple pawls 426 disposed about the hollow body 406, and (iii) a sleeve 418 coupled to the hollow body 406 while substantially surrounding at least a section of the hollow body 406 and the pawls 426. The hollow body 406 of the nozzle holder 404 defines a proximal end 408 and a distal end 410 with a longitudinal axis A extending therethrough. The distal end 410 is the end that is closest to a workpiece during an operation of the laser head in which the nozzle holder 404 is installed, and the proximal end 408 is opposite of the distal end 410. The distal end 410 of the hollow body 406 includes an opening 411 for receiving the laser nozzle 402. In addition, multiple apertures 412 are dispersed around a circumference of the hollow body 406, where each aperture 412 extends from an inner wall 414 to an outer wall 416 of the hollow body 406. In some embodiments, three or more apertures 412 are disposed evenly around a circumference of the hollow body 406 (e.g., about 120 degrees apart circumferentially about the hollow body 406).

Figure 6:
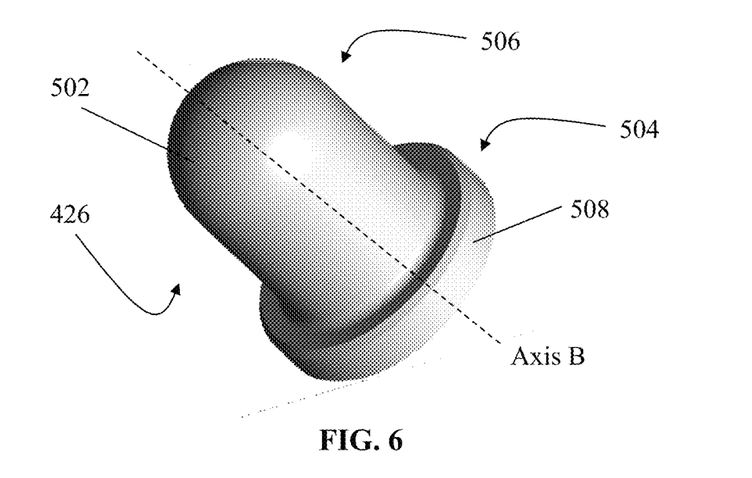
FIG. 6 shows an exemplary configuration of a pawl of the connection mechanism for the female component of FIGS. 5a and 5b, according to some embodiments of the present invention.

The multiple pawls 426 of the holder 404 are configured to operably engage the laser nozzle 402 within the hollow body 406 by extending through respective ones of the multiple apertures 412 of the hollow body 406. The pawls 426 are generally located around an outer circumference of the hollow body 406 at about the same radial locations as the apertures 412. In some embodiments, three or more pawls 426 are disposed evenly around an outer circumference of the hollow body 406 (e.g., about 120 degrees apart circumferentially about the hollow body 406). FIG. 6 shows an exemplary configuration of a pawl 426 of the connection mechanism for the female component (e.g., the nozzle holder) 404 of FIGS. 5a and 5b, according to some embodiments of the present invention. As shown, each pawl 426 defines a pawl body 502 having a proximal portion 504 and a distal portion 506 with a longitudinal axis B extending therebetween. The distal portion 506 of the pawl body 502 is configured to facilitate engagement of the pawl 426 with the laser nozzle 402 located in the hollow body 406. For example, the distal portion 506 of each pawl body 502 can include a substantially curved (e.g., globular) tip configured to extend through the corresponding aperture 412 in the hollow body 406 to engage with a complementarily-shaped groove 431 of the laser nozzle 402 (as shown in FIGS. 5a and 5b). The proximal portion 504 of each pawl body 502 is configured to facilitate disengagement of the pawl 426 from the laser nozzle 402. As shown in FIG. 6, the proximal portion 504 of the pawl body 502 includes at least one flange 508 that extends substantially perpendicular (i.e., normal) to the longitudinal axis B of the pawl body 502. The flange 508 of the pawl 426 is adapted to contact a portion of the sleeve 418 of the nozzle holder 404, where the sleeve 418 can displace the pawl 426 away from the groove 431 and the aperture 412, thereby disengaging the nozzle holder 404 from the laser nozzle 402. Details regarding these disengagement features are described below.

With respect to FIGS. 5a and 5b, the sleeve 418 of the nozzle holder 404 is coupled to the hollow body 406 and substantially surrounds at least a portion of the outer wall 416 of the hollow body 406. The sleeve 418 includes a distal portion 420, a proximal portion 422 and a spring 430 disposed between the distal and proximal portions 420, 422. In some embodiments, the proximal portion 422 of the sleeve 418 is configured to couple the sleeve 418 to the hollow body 406, such as via press fit. In some embodiments, the proximal portion 422 of the sleeve 418 can include one or more thread engagement sections 432 disposed on an interior surface to matingly engage a cutting head (not shown).

Figure 7A:
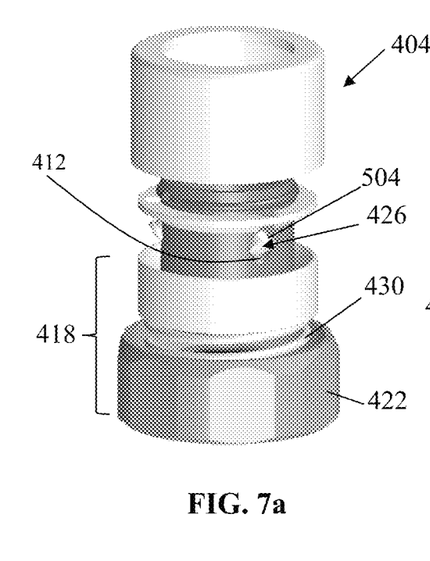
FIGS. 7a and b show an exploded view and a partial cross-sectional view, respectively, of a pawl in relation to various elements of the sleeve of the female component of FIGS. 5a and 5b, according to some embodiments of the present invention.
Figure 7B:
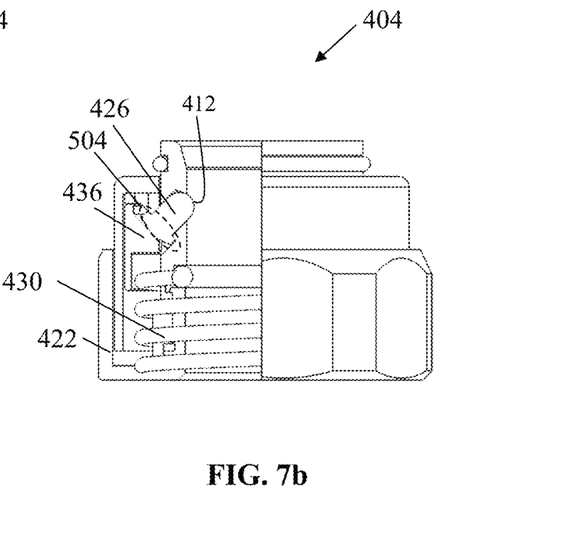

The sleeve 418 also substantially surrounds the pawls 426 such that at least a portion of each pawl 426 (e.g., the proximal portion 504) is disposed between the distal portion 420 and the proximal portion 422 of the sleeve 418. FIGS. 7a and b show an exploded view and a partial cross-sectional view, respectively of a pawl 426 in relation to various elements of the sleeve 418 of the female component (e.g., the nozzle holder) 404 of FIGS. 5a and 5b, according to some embodiments of the present invention. The distal end of the spring 430 of the sleeve 418 can be in physical communication with the proximal portion 504 of each pawl 426, either directly contacting the proximal portion 504 or via an intermediate translator 436 sandwiched between the spring 430 and the pawl 426. In some embodiments, the intermediate translator 436 is configured as a ramp that drives/guides the corresponding pawl 426 into the respective aperture 412 during engagement or away from the aperture 412 during disengagement. The proximal end of the spring 430 can be in physical communication with (e.g., directly contacting) the proximal portion 422 of the sleeve 418, which is affixed to the hollow body 406 as described above. In some embodiments, the proximal end of the spring 430 is affixed to the proximal portion 422 of the sleeve 418. The spring 430 is configured to exert a biasing force in the distal direction on the proximal portion 504 of each pawl 426, either via direct contact or via the intermediate translator 436, to axially and radially (e.g., diagonally) displace the pawl 426 relative to longitudinal axis A, such that the pawl 426 extends through its corresponding aperture 412 in the hollow body 406.

Figure 8A:
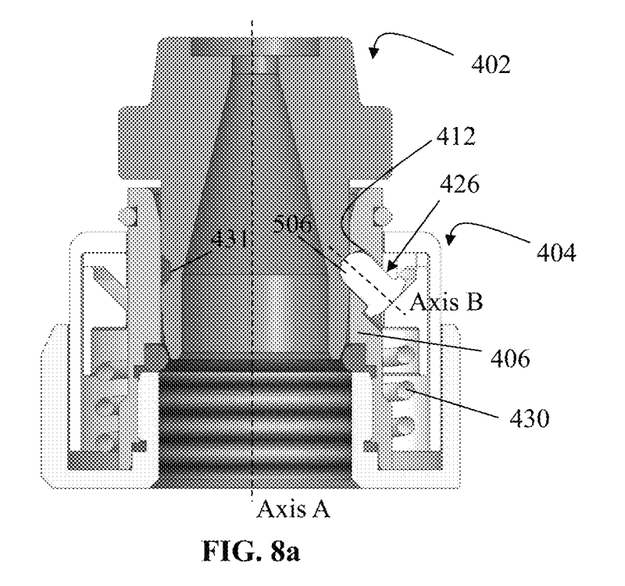
FIGS. 8a and 8b show a sectional view and a side view, respectively, of the female component and the male component of FIGS. 5a and 5b after engagement, according to some embodiments of the present invention.
Figure 8B:
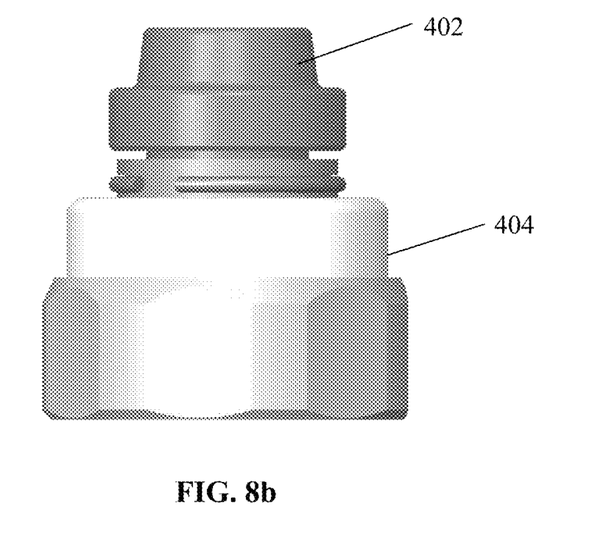

Thus, when the spring 430 is in its extended position and no compression force is applied to the spring 430, at least a portion of each pawl 426 is urged to nest within its corresponding aperture 412. Further, longitudinal axis B of each pawl body 502 is oriented at a non-normal angle relative to longitudinal A axis of the hollow body 406 while each pawl 426 resides in its corresponding aperture 412. Such positioning occurs when the nozzle holder 404 is ready for engagement with the laser nozzle 402, as shown in FIGS. 5a and 5b, where the distal portions 506 of the pawls 426 are exposed and protrude from the inner wall 414 of the hollow body 406. Such positioning also occurs after the engagement of the nozzle 402 with the nozzle holder 404, where the globular tip of each pawl 426 provides a narrow precise surface that contacts and locks into the groove 431 of the laser nozzle 402 once the laser nozzle 402 is inserted into the nozzle holder 404. FIGS. 8a and 8b show a sectional view and a side view, respectively, of the female component (e.g., the nozzle holder) 404 and the male component (e.g., the laser nozzle) 402 of FIGS. 5a and 5b after engagement, according to some embodiments of the present invention. As shown, when the spring 430 is extended in an engaged position between the male and female components 402, 404, the pawls 426 nest in their respective apertures 412 with their globular tips at the distal portions 506 inter-fit with groove 431 of the laser nozzle 402.

Referring back to FIGS. 5a and 5b in some embodiments, the distal portion 420 of the sleeve 418 is adapted to define a pawl retractor 428 that maintains physical contact with the proximal portion 504, such as the flange 508, of each pawl 426. The pawl retractor 428 is translatahle/slidable along longitudinal axis A. The pawl retractor 428 is configured to engage the flanges 508 of the respective pawls 426 and, upon receiving an external force in the proximal direction, to overcome the biasing force of the spring 430 and physically displace/retract the pawls 426 from their apertures 412 for disengagement from the laser nozzle 402. Because the flange 508 is angled at a non-normal direction with respective to longitudinal axis A of the hollow body 406, the force exerted by the pawl retractor 428 on the flange 508 causes displacement of the pawl 426 both axially and radially (e.g., diagonally) relative to longitudinal axis A. In some embodiments, the external force applied to the pawl retractor 428 for the purpose of disengagement is from a human operator or a changing machine.

In some embodiments, the nozzle holder 404 includes a sealing surface disposed on the inner wall 414 of the hollow body 406. The sealing surface configured to receive an O-ring 440 that sealingly engages a corresponding surface of the laser nozzle 402 retained to the nozzle holder 404 by the pawls 426 in the engaged position. In some embodiments, the hollow body 406, the plurality of pawls 426 and the sleeve 418 are made from at least one electrically conductive material, such as the same conductive material or different conductive materials. Thus, the nozzle holder 404 can form a conductive current path therethrough for conducting a current to and from the laser nozzle 402 upon engagement.

In general, the usage of the pawls 426 in the female component (e.g., the nozzle holder) 404 for engagement with the male component (e.g., the laser nozzle 402) provides a closer and more precise location of contact between the two components 402, 404 (e.g., at the tip/distal portions 506 of the pawls). Thus, the force used to engage the two components 402, 404 is more directly applied for enhanced security. In addition, locating the retraction mechanism at the proximal portions 504 of the pawls 426 (e.g., at the flange 508) allows the pawls 426 to reside closer to the entry/exit port adjacent to the distal opening at the distal end 410 of the nozzle holder 404. This enables easier installation and removal of the male component 402 relative to the female component 404 and provides a better retaining force than that of the prior art designs of FIGS. 1-4, as the pawls 426 of the female component 404 applies a more direct force from the spring 430 to the male component 402 for a more secured connection closer to the workpiece. In some embodiments, longitudinal and radial alignment between the male and female components 402, 404 is more precise as the exact contact points at the tips of the pawls 426 are known as opposed to the prior art arrangements of FIGS. 1-4 where contact can occur across a large surface of any of the rods or pins, which can lead to an unbalanced connection across the one or more rods or pins. Further, because the pawls 426 reside in the retraction mechanism itself (e.g., in physical contact with the pawl retractor 428), the pawls 426 are pulled away by the pawl retractor 428 during disengagement whereas additional pushing force needs to be applied to the male component to achieve disengagement or the components need to be oriented in a certain way to encourage disengagement by gravity.

Figure 9:
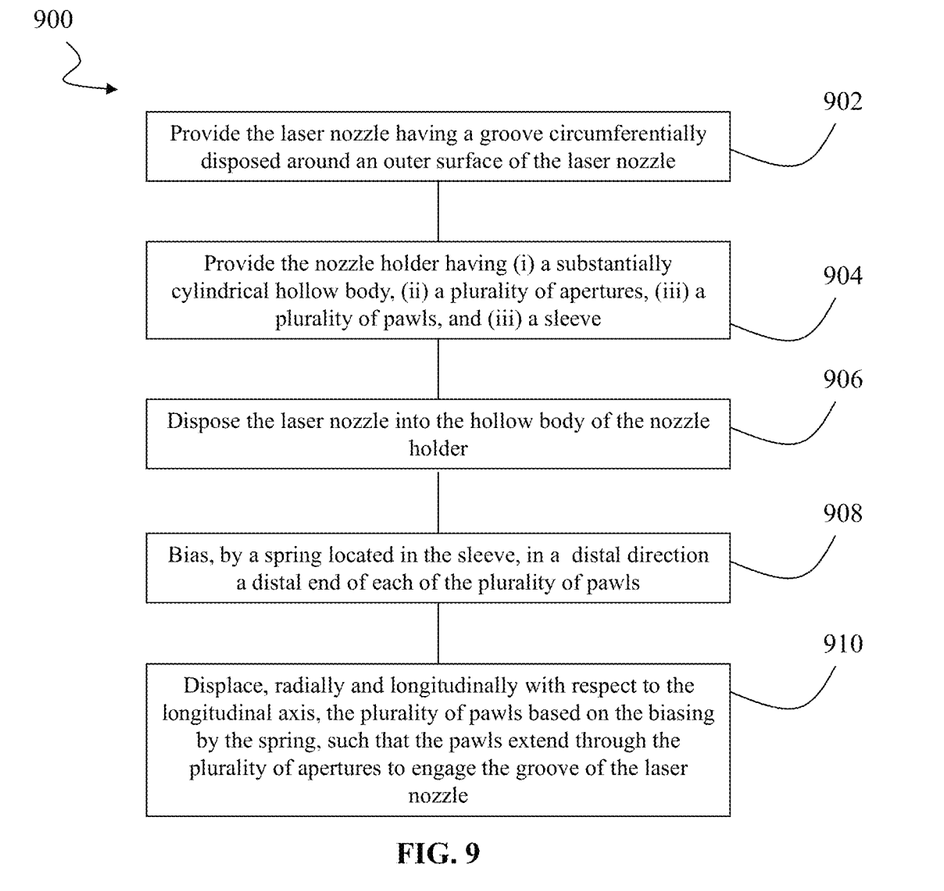
FIG. 9 shows an exemplary process for operating the connection mechanisms of the female and male components of FIGS. 5a and 5b, according to some embodiments of the present invention.

FIG. 9 shows an exemplary process 900 for operating the connection mechanisms of the female and male components of FIGS. 5a and 5b, according to some embodiments of the present invention. At step 902, the male component (e.g., the laser nozzle) 402 is provided, where the laser nozzle 402 includes a connection feature, such as the groove 431 that is circumferentially disposed around an outer surface of the nozzle 402. At step 904, the female component (e.g., the nozzle holder 404) is provided for engagement with the male component 402. To engage the male component 402 and the nozzle holder 404, the nozzle 402 is first disposed into the substantially cylindrical hollow body 406 of the nozzle holder 404 via the distal opening at the distal end 410 of the hollow body 406 (step 906). The spring 430 in the sleeve 418 of the nozzle holder 404 that substantially surrounds at least a portion of the outer wall 416 of the hollow body 406 is configured to bias one or more pawls 426 of the sleeve 418 for engagement with the nozzle 402 in the hollow body 406 (step 908). Specifically, the spring 430 is adapted to exert a biasing force in the distal direction on the proximal portion 504 of each pawl 426, via either direct contact with the proximal portion 504 or an intermediate translator 436 of the sleeve 418. The force exerted by the spring 430 is adapted to displace the pawls 426 both radially and longitudinally with respect to longitudinal axis A of the hollow body 406, such that the pawls 426 extend through their corresponding apertures 412 on the hollow body 406 (step 910). Extension of the pawls 426 through the apertures 4.12 allow the distal portion 506 of each pawl 426 to inter-fit into the groove 431 of the laser nozzle 402 within the hollow body 406, thereby realizing a secure engagement between the laser nozzle 402 and the nozzle holder 404.

In some embodiments, to disengage the laser nozzle 402 from the nozzle holder 404, an external force (in the proximal direction along longitudinal axis A) is applied to the translatable pawl retractor 428 at the distal portion 420 of the sleeve 418. The pawl retractor 428 is configured to maintain physical contact with the proximal portion 504 of each of the pawls 426, such as with the flange 508 on each pawl 426. The external force applied to the pawl retractor 428 displaces the pawl retractor 428 in the proximal direction, which in turn displaces (e.g., drives) the pawls 426 both longitudinally and radially (with respect to longitudinal axis A) to retract from their respective apertures 412, thereby disengaging the pawls 426 from the groove 431 of the nozzle 402. Thus the female component 404 actuates disengagement with the male component 402. After the retraction of the pawls 426, the nozzle 402 can be removed from the hollow body 406 of the nozzle holder 404 without any impediment.

Within the context of the present invention, the term "about" in relation to a particular degree value can be constructed as covering a range of ±four-degree deviation from the particular degree value. It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A nozzle holder for a laser processing head of a laser processing system, the nozzle holder comprising:
   a hollow body shaped to matingly engage a laser nozzle, the hollow body defining a distal end, a proximal end and a longitudinal axis extending therethrough and a plurality of apertures dispersing around a circumference of the hollow body, each of the plurality of apertures extending from an inner wall to an outer wall of the hollow body, wherein the laser nozzle is received from the distal end of the hollow body;
   a plurality of pawls configured to operably engage the laser nozzle within the hollow body, wherein each pawl of the plurality of pawls has (i) a distal portion configured to extend through a corresponding one of the plurality of apertures of the hollow body to operably engage the laser nozzle and (ii) a proximal portion; and
   a sleeve coupled to the hollow body while surrounding at least a portion of the hollow body and the plurality of pawls, wherein a distal portion of the sleeve includes a pawl retractor that is movable along the longitudinal axis with the sleeve to physically contact the plurality of pawls and apply an external force on the proximal portions of the plurality of pawls in a direction toward the proximal end of the hollow body to physically displace the plurality of pawls axially and radially relative to the longitudinal axis away from the hollow body, thereby pulling the distal portion of each of the plurality of pawls away from the corresponding ones of the plurality of apertures for disengagement of the plurality of pawls from the laser nozzle, and wherein the pawl retractor maintains physical contact with the plurality of pawls during both engagement with and disengagement from the laser nozzle.

2. The nozzle holder of claim 1, wherein each of the plurality of pawls defines a pawl body having the proximal portion and the distal portion with a second longitudinal axis extending therebetween, wherein the distal portion of each of the plurality of pawls is configured to enable engagement of the pawl with the laser nozzle and wherein the proximal portion of each of the plurality of pawls is configured to facilitate disengagement of the pawl from the laser nozzle.

3. The nozzle holder of claim 2, wherein the second longitudinal axis is oriented at an angle not perpendicular relative to the longitudinal axis of the hollow body when at least a portion of the pawl body of each of the plurality of pawls is located within the corresponding aperture.

4. The nozzle holder of claim 2, wherein the distal portion of each pawl includes a globular tip configured to extend through the corresponding aperture to engage with a complementarily-shaped groove of the laser nozzle.

5. The nozzle holder of claim 2, wherein the proximal portion of each pawl includes at least one flange configured to maintain physical contact with the pawl retractor of the sleeve.

6. The nozzle holder of claim 5, wherein the at least one flange extends in a perpendicular direction relative to the second longitudinal axis of the pawl body.

7. The nozzle holder of claim 5, wherein the pawl retractor is configured to engage the at least one flange of each of the plurality of pawls to physically displace the plurality of pawls and retract the plurality of pawls from the plurality of apertures for disengagement from the laser nozzle.

8. The nozzle holder of claim 1, wherein the plurality of pawls comprise three pawls located about 120 degrees apart circumferentially about the hollow body.

9. The nozzle holder of claim 1, wherein the sleeve includes a proximal portion and the distal portion, the proximal portion configured to connect to the hollow body, and the distal portion includes the pawl retractor.

10. The nozzle holder of claim 9, wherein the sleeve further includes a thread engagement section disposed on an interior surface of the sleeve at the proximal portion.

11. The nozzle holder of claim 9, wherein the sleeve further includes a spring disposed between the proximal portion and the distal portion.

12. The nozzle holder of claim 11, wherein the spring is configured to exert a biasing force to axially and radially displace the plurality of pawls relative to the longitudinal axis, thereby causing the plurality of pawls to extend through the respective ones of the plurality of apertures to engage the laser nozzle.

13. The nozzle holder of claim 12, wherein when the spring is extended, the plurality of pawls are adapted to create an effective inner diameter of the hollow body that is smaller than an outer diameter of the laser nozzle.

14. The nozzle holder of claim 11, wherein the pawl retractor maintains physical contact with the distal portion of each of the plurality of pawls, wherein the pawl retractor is slidable along the longitudinal axis and configured to overcome the biasing force of the spring to radially and axially displace the plurality of pawls away from respective ones of the plurality of apertures for disengagement from the laser nozzle.

15. The nozzle holder of claim 1, wherein the hollow body, the plurality of pawls and the sleeve are made from at least one electrically conductive material.

16. The nozzle holder of claim 15, wherein the nozzle holder forms a conductive current path through the nozzle holder.

17. The nozzle holder of claim 1, further comprising a sealing surface disposed on the inner wall of the hollow body, the sealing surface configured to receive an O-ring that sealingly engages a corresponding surface of the laser nozzle that is retained to the nozzle holder by the plurality of pawls.

18. The nozzle holder of claim 1, wherein the sleeve further comprises:
   a proximal portion configured to connect to the hollow body;
   a spring disposed between the proximal portion of the sleeve and the distal portion of the sleeve, the spring configured to exert a biasing force on the plurality of pawls to longitudinally and radially displace the plurality of pawls, such that the plurality of pawls extend through respective ones of the plurality of apertures to engage the laser nozzle,
   wherein the pawl retractor is adapted to overcome the biasing force of the spring to longitudinally and radially displace the plurality of pawls away from respective ones of the plurality of apertures for disengagement from the laser nozzle.

19. A method for engaging and disengaging a laser nozzle relative to a nozzle holder of a laser processing head in a laser processing system, the method comprising:
   providing the laser nozzle having a groove circumferentially disposed around an outer surface of the laser nozzle;
   providing the nozzle holder having:
      a hollow body shaped to matingly engage the laser nozzle, the hollow body defining a distal end, a proximal end and a longitudinal axis extending therethrough, the laser nozzle being received from the distal end of the hollow body, and a plurality of apertures dispersing around a circumference of the hollow body, each of the plurality of apertures extending from an inner wall to an outer wall of the hollow body,
      a plurality of pawls configured to operably engage the laser nozzle within the hollow body, wherein each pawl of the plurality of pawls has (i) a distal portion configured to extend through a corresponding one of the plurality of apertures of the hollow body to operably engage the laser nozzle and (ii) a proximal portion, and
      a sleeve coupled to the hollow body while surrounding at least a portion of the hollow body and the plurality of pawls, wherein a distal portion of the sleeve includes a pawl retractor that is movable along the longitudinal axis with the sleeve to physically contact the plurality of pawls and apply an external force on the proximal portions of the plurality of pawls in a direction toward the proximal end of the hollow body to physically displace the plurality of pawls axially and radially relative to the longitudinal axis away from the hollow body, thereby pulling the distal portion of each of the plurality of pawls away from the corresponding ones of the plurality of apertures for disengagement of the plurality of pawls from the laser nozzle, and wherein the pawl retractor maintains physical contact with the plurality of pawls during both engagement with and disengagement from the laser nozzle;

disposing the laser nozzle into the hollow body of the nozzle holder;

biasing in a distal direction, by a spring located in the sleeve, the proximal portion of each of the plurality of pawls to engage the laser nozzle to the nozzle holder; and displacing, radially and longitudinally with respect to the longitudinal axis, the plurality of pawls based on the biasing by the spring, such that the plurality of pawls extend through respective ones of the plurality of apertures to engage the groove of the laser nozzle.

20. The method of claim 19, further comprising:

applying a force on the pawl retractor in the direction toward the proximal end of the hollow body of the nozzle holder to urge the pawl retractor to physical contact a distal flange of each of the plurality of pawls; and displacing, radially and longitudinally by the pawl retractor, the plurality of pawls away from respective ones of the plurality of apertures, thereby disengaging the laser nozzle from the nozzle holder.

* * * * *